(12) United States Patent
May (10) Patent No.: US 9,313,183 B2
(45) Date of Patent: **\*Apr. 12, 2016**

(54) POLICY-BASED CONFIGURATION OF INTERNET PROTOCOL SECURITY FOR A VIRTUAL PRIVATE NETWORK

(71) Applicant: Fortinet, Inc., Sunnyvale, CA (US)

(72) Inventor: Robert A. May, Vancouver (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/699,367

(22) Filed: Apr. 29, 2015

(65) Prior Publication Data

US 2015/0244691 A1    Aug. 27, 2015

Related U.S. Application Data

(63) Continuation of application No. 13/461,433, filed on May 1, 2012, now Pat. No. 9,065,802.

(51) Int. Cl.
*G06F 17/00* (2006.01)
*H04L 29/06* (2006.01)
*H04L 12/46* (2006.01)
*G06F 15/173* (2006.01)

(52) U.S. Cl.
CPC ........ *H04L 63/0485* (2013.01); *H04L 12/4641* (2013.01); *H04L 63/0272* (2013.01); *H04L 63/10* (2013.01); *H04L 63/20* (2013.01); *H04L 63/164* (2013.01); *H04L 63/166* (2013.01)

(58) Field of Classification Search
CPC .... H04L 63/20; H04L 63/102; G06F 21/6218
USPC .......... 380/255–256, 270–274; 713/150–154, 713/160–163; 726/11–15
See application file for complete search history.

(56) References Cited

U.S. PATENT DOCUMENTS

| | | | |
|---|---|---|---|
| 9,065,802 B2 | 6/2015 | May | |
| 2010/0191829 A1* | 7/2010 | Cagenius | H04L 12/2834 709/219 |
| 2011/0023090 A1* | 1/2011 | Asati | H04L 12/4633 726/4 |
| 2011/0066858 A1* | 3/2011 | Cheng | H04L 63/164 713/171 |
| 2013/0298182 A1 | 11/2013 | May | |

OTHER PUBLICATIONS

Notice of Allowance for U.S. Appl. No. 13/461,433 mailed May 6, 2015.
Final Rejection for U.S. Appl. No. 13/461,433 mailed Mar. 6, 2014.
Non-Final Rejection for U.S. Appl. No. 13/461,433 mailed Oct. 22, 2013.

* cited by examiner

*Primary Examiner* — Evans Desrosiers
(74) *Attorney, Agent, or Firm* — Hamilton, DeSanctis & Cha LLP (57) ABSTRACT

A method for performing policy-based configuration of Internet Protocol Security (IPSec) for a Virtual Private Network (VPN) is provided. According to one embodiment, a policy page through which a policy, including multiple VPN settings for establishing a VPN connection, may be viewed and configured is displayed via a user interface of a source network device. The VPN settings include a type of IPSec tunnel to be established between the source network device and a peer network device. A selection regarding the type of IPSec tunnel to be used for the VPN connection is received via the user interface. The source network device requests the VPN connection be established between the source network device and the peer network device in accordance with the policy by sending a notification request to the peer network device. The notification requests includes parameter values associated with the VPN settings.

5 Claims, 9 Drawing Sheets

POLICY-BASED CONFIGURATION OF INTERNET PROTOCOL SECURITY FOR A VIRTUAL PRIVATE NETWORK

CROSS-REFERENCE TO RELATED APPLICATIONS

This application is a continuation of U.S. patent application Ser. No. 13/461,433, filed May 1, 2012, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2012-2015, Fortinet, Inc.

BACKGROUND

1. Field

Embodiments of the present invention generally relate to the field of communication networks. In particular, various embodiments relate to methods and systems for automating and facilitating establishment of Virtual Private Network (VPN) tunnels among peer devices in a network.

2. Description of the Related Art

Data communication networks include various network devices such as routers, firewall security devices, computer systems, hubs, switches, coupled to and configured to pass data to one another. The data is propagated through the communication network by passing data packets between network devices by using one or more communication links. A particular data packet may be handled by multiple network devices as it travels from the source to the destination address over the communication network.

Various network devices communicate with each other using a predefined set of rules, also known as protocols. Different protocols are used to govern different aspects of communication, such as, formation of signal between network devices, handling and routing of data packets through the network.

A Virtual Private Network (VPN) may be formed by connecting two or more network devices over a public network using encryption or other means to secure the transmission between the network devices. Using VPN tunnels over a public network, such as the Internet, enables a network having geographically separated components to be set up as a single autonomous network. A VPN tunnel may be set up by logging in at one end-point and configuring an Internet Protocol Security (IPSec) interface and defining the firewall policies. A similar set-up may be created at the other end-point. However, in such an interface-based configuration of the IPSec tunnel, much time is consumed in setting up the configuration parameters at both ends. Moreover, errors and/or discrepancies may be introduced as a result of the administrator having to manually enter configuration parameters multiple times for corresponding IPSec interface on peer end-points.

SUMMARY

Methods and systems are described for performing policy-based configuration of Internet Protocol Security (IPSec) for a Virtual Private Network (VPN). According to one embodiment, a policy page through which a policy, including multiple VPN settings for establishing a VPN connection, may be viewed and configured is displayed via a user interface of a source network device. The VPN settings include a type of IPSec tunnel to be established between the source network device and a peer network device. A selection regarding the type of IPSec tunnel to be used for the VPN connection is received via the user interface. The source network device requests the VPN connection be established between the source network device and the peer network device in accordance with the policy by sending a notification request to the peer network device. The notification requests includes parameter values associated with the VPN settings.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Methods and systems are described for performing policy-based configuration of Internet Protocol Security (IPSec) for a Virtual Private Network (VPN). Due to the potential for error while attempting to manually configure multiple corresponding peer interfaces for participation in a VPN, there is a need for methods and systems that facilitate and/or automate VPN tunnel setup.

According to an embodiment of the present invention, a single policy page is used to setup a VPN tunnel. At the single policy page of network device GUI, at least one Internet Protocol Security (IPSec) tunnel type is selected from a set of IPSec tunnel types. Parameter values for the selected IPSec tunnel are then configured via various VPN settings/options displayed via the policy page. The VPN parameter configuration data is transmitted from the source network device (the network device upon which the policy is established) to the peer network device by way of a notification message that includes a policy file containing the parameter configuration data. Upon acceptance of the VPN connection at the peer network device, the peer network device is configured with the VPN parameter configuration data.

According to an embodiment, the configuration of the at least one network device is automatic and the configuration includes downloading the source and destination addresses of the VPN tunnel as well as all of the networks that are behind each gateway. In this manner, the VPN tunnel end points are made aware of which networks are allowed to send traffic over the VPN tunnel to each other.

According to an embodiment, the network through which the VPN connection is established is the Internet or a Wide Area Network (WAN).

According to an embodiment, the policy page may be provided via a web-based portal and the policy page is capable of configuring a firewall policy of one or more network devices. Further, the portal and a remote management device that is centrally managing the network devices may be integrated. The network devices may be selected from a group comprising a router, a network switch, a firewall security device, a gateway, a modem, a broadband device, and a computer system.

According to an embodiment, the VPN parameter configuration data includes a gateway address, an authentication method, a user group, a Domain Name System (DNS) server, and a crypto profile.

According to an embodiment, the type of IPSec tunnel may be selected from a group comprising a site-to-site tunnel configuration, dial-up server configuration, and a remote access dial-up server configuration.

According to various embodiments, the disclosed method provides a single policy page to configure gateways at both ends of a VPN tunnel. Further, any policy changes that occur after the initial bootstrapping are synced automatically avoiding any need to redo the notification/bootstrap process on the gateway side. Further, the client side is read-only (for those VPN configuration parameters that are needed to setup and maintain the VPN) and if a user accidentally overwrites or deletes such VPN configuration parameters on the configuration, the changes are detected and the configuration re-synced. Notably, however, various options on the policy page that are not needed to setup and maintain the VPN may be edited on either end of the VPN tunnel. Certain options on the policy page may be set differently on one end of the VPN tunnel than the other. For example, it is permissible for web filtering to be applied at one end of the VPN tunnel and not the other. In this manner, flexibility is maintained while preserving the VPN.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

While for sake of illustration embodiments of the present invention are described with reference to switching devices and firewall security devices available from the assignee of the present invention, it is to be understood that the methods and systems of the present invention are equally applicable to switching devices and firewall security devices that are manufactured by others, including, but not limited to, Barracuda Networks, Brocade Communications Systems, Inc., CheckPoint Software Technologies Ltd., Cisco Systems, Inc., Citrix Systems, Inc., Imperva Inc., Juniper Networks, Inc., Nokia, Palo Alto Networks, SonicWall, Inc. and Syntensia AB.

Similarly, for sake of illustration, various embodiments of the present invention are described with reference to, physical firewall security devices being members of load balancing clusters, it is to be understood that the methods and systems of the present invention are equally applicable to environments in which the firewall security devices are implemented as virtual systems in which case a physical device could have virtual systems belonging to multiple clusters.

TERMINOLOGY

Brief definitions of terms used throughout this application are given below.

The term "client" generally refers to an application, program, process or device in a client/server relationship that requests information or services from another program, process or device (a server) on a network. Importantly, the terms "client" and "server" are relative since an application may be a client to one application but a server to another. The term "client" also encompasses software that makes the connection between a requesting application, program, process or device to a server possible, such as an FTP client. In the VPN tunnel setup, the client may be a network device that receives a notification for establishment of a VPN tunnel and accepts the connection request.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in one embodiment," "according to one embodiment," "and the like" generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

The term "firewall security device" generally refers to a logical or physical device that provides firewall security functionality by implementing various firewall policies; however, a firewall security device is not limited to performing firewall security functionality and may perform other content processing functions, including, but not limited to scanning/processing of web (HTTP), file transfer (FTP), and email (SMTP, POP3, and IMAP), antivirus processing, intrusion prevention and hardware acceleration. In some embodiments, the firewall security devices are specialized processing blades installed within a chassis that also includes a load balancing hub blade, such as a sophisticated Ethernet switching device. In some embodiments, a physical device (e.g., a processing blade) may include multiple virtual systems that operate as firewall security devices.

The term "switching device" generally refers to a multi-port bridge. For example, a switching device may be an active element working on layer 2 of the Open Systems Interconnection (OSI) model. Switching devices may use filtering/switching techniques that redirect data flow to a particular firewall security device, based on certain elements or information found in network traffic data packets. In one embodiment, a switching device distributes network traffic data packets among its ports (and associated firewall security devices) depending upon the content, elements or information associated with the packet and/or packet header, including, but not limited to a source or destination address, a source or destination port and the like.

Figure 1:
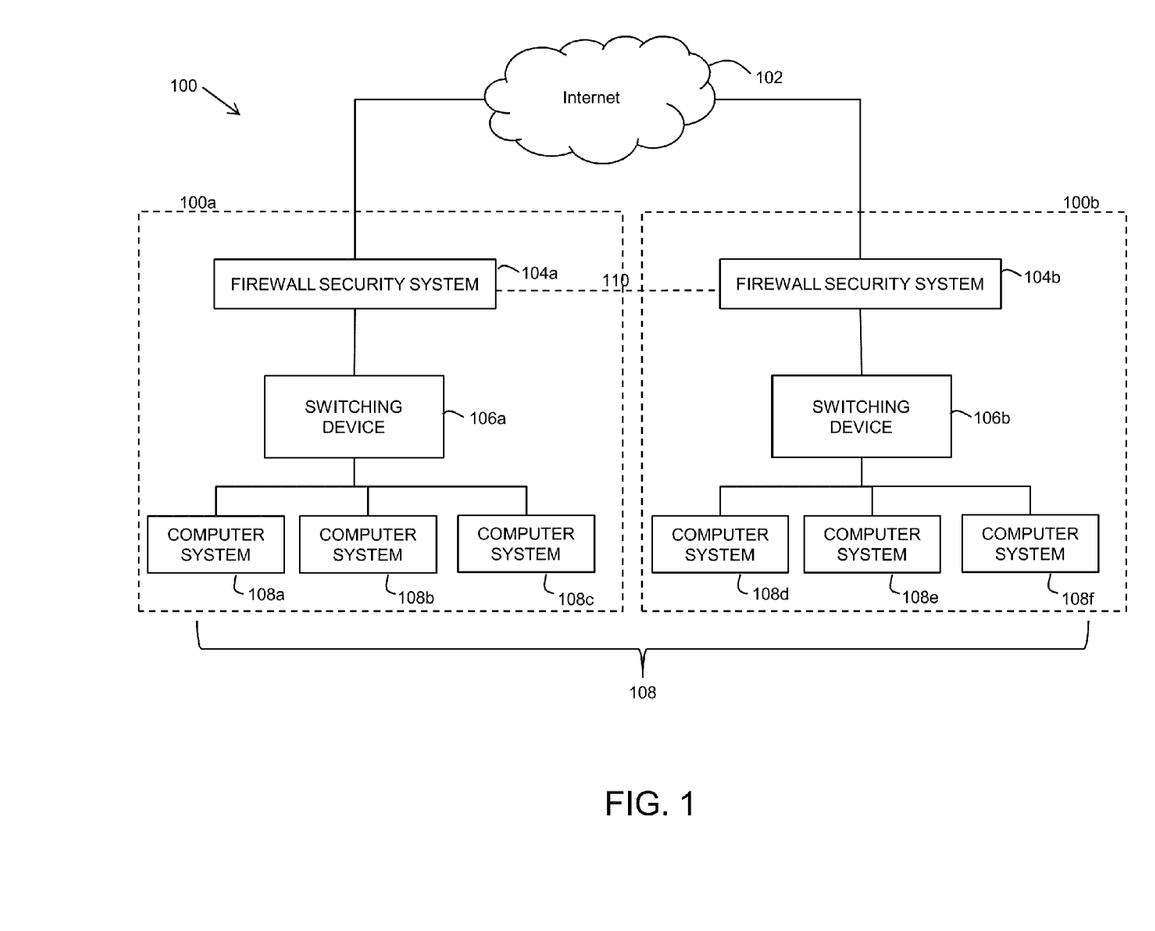
FIG. 1 is a block diagram illustrating a simplified network in which embodiments of the present invention may be employed.

FIG. 1 is a block diagram illustrating a simplified network 100 in which embodiments of the present invention may be employed. Network 100 may represent a private or public network, such as a Local Area Network (LAN), a Wireless LAN (WLAN) or the Internet 102. In the present example, network 100 includes a plurality of firewall security devices 104a and 104b, one or more switching devices 106a and 106b (which hereinafter may be referred to simply as switches), and one or more computer systems 108a-f. Network 100 may further be categorized into two networks 100a and 100b. Network 100a comprises firewall security device 104a, switch 106a, and computer systems 108a-c. On the other hand, network 100b comprises firewall security device 104b, switch 106b, and computer systems 108c-f.

In another embodiment of the present invention, the network 100 may also include routers. Routers are devices that forward data packets from one network to another. In one embodiment, router forwards data packets from network 100a to network 100b.

According to various embodiments of the present invention, firewall security devices 104a and 104b are used to protect network 100 from unauthorized access while permitting legitimate communication to pass. Firewall security devices 104a and 104b add a level of protection between computer systems 108a-f and the Internet 102, and permit or deny network transmissions based upon a set of rules. Further, firewall security devices 104a and 104b help to prevent viruses and worms from entering computer systems 108a-f and hence protect the computer systems from threats. Firewall security devices 104a and 104b may further implement firewall policies to control what users of computer systems 108a-f have access to.

According to various embodiments of the present invention, firewall security devices 104a and 104b (i) provide gateway defense; (ii) carry out defined security policies; (iii) hide and protect internal network addresses; (iv) report on threats and activity; and (v) segregate activity between a trusted network, and the Internet.

With continuing reference to FIG. 1, firewall security devices 104a and 104b are connected to switching devices 106a and 106b, respectively. In an embodiment, switch 106a and switch 106b may comprise network switches or Ethernet switches. A network switch is a computer networking device that connects various segments of network 100. Further, in operation, switch 106a and switch 106b (collectively known as network switches) may process and route data at the data link layer, i.e., layer 2 of the Open Systems Interconnection (OSI) model. In an embodiment, network switches may process data at the network layer, i.e., layer 3 of the OSI model. Alternatively, network switches may represent a multi-layer switch and operate at multiple layers of the OSI model.

In an embodiment, switch 106a is capable of channeling incoming data from computer systems 108a-c to a specific output port of switch 106a that will take the data packets to an intended destination. In an embodiment operable within an Ethernet LAN, switch 106a determines from the physical device address in each incoming data packet, which device the data packet is intended for and switches it out toward that device.

Referring to FIG. 1, switch 106a and switch 106b are connected to computer systems 108a-f. Though in FIG. 1, for the sake of illustration, six computer systems 108a-f are shown, network 100 can have more or fewer computer systems.

In an embodiment, computer systems 108a-f are configured to work as client devices. In another embodiment, computer systems 108a-f are configured to work as server computers. In still another embodiment, computer systems 108a-f may comprise a combination of client devices and server computers. According to various embodiments of the present invention, computer systems 108a-f may serve as a data center to house telecommunications and storage systems. The data center may include backup power supplies, data communications connections, environmental controls and security devices. Examples of computer systems 108a-f include desktop computers, laptops, notebook computers, handheld devices, such as mobile phones, smart phones, palm-top computers, Personal Digital Assistants (PDAs), navigational units and so forth. Various applications may be run on computer systems 108*a-f*. Examples of the applications include, but are not limited to, web browsers, software applications, email applications and chat applications.

In an embodiment, computer systems 108*a-f* are connected in a Virtual Private Network (VPN). A VPN is a network that uses primarily public telecommunication infrastructure, such as the Internet, to provide remote, mobile or local users with access to a central organizational network. For example, an employee travelling or working from home can use a VPN to securely access the office network, for example network 100*a*, through the Internet 102. In the VPN, the remote user is authenticated and data is securely encrypted to prevent disclosure of private information to unauthorized parties. The data in the VPN travels between the remote user and a private network through a tunnel. The data can be accessed only at both ends of the VPN tunnel.

The VPN may use various tunneling protocols to provide confidentiality and message integrity of the data being shared. Some of the secure protocols that the VPN may use are as follows:

Internet Protocol Security (IPSec): IPSec is a protocol suite for securing IP communications by authenticating and encrypting each IP packet of a communication session. IPSec is an end-to-end security scheme operating in the Internet layer of the IP suite. It may be used in protecting data flows between a pair of hosts, between a pair of security gateways, or between a security gateway and a host. IPSec is an open standard, and uses protocols such as Authentication Headers (AH), Encapsulating Security Payloads (ESP), and Security Associations (SA), to perform various functions.

Transport Layer Security (TLS)/Secure Sockets Layer (SSL): These are cryptographic protocols that provide communication security over the Internet. TLS and SSL encrypt the segments of network connections above the transport layer, using asymmetric cryptography for key exchange, symmetric encryption for privacy, and message authentication codes for message integrity.

Secure Shell (SSH) VPN: Secure Shell (SSH) is a network protocol for secure data communication, remote shell services or command execution and other secure network services between two networked computers (client and a server) that the SSH connects via a secure channel over an insecure network.

In an embodiment, a VPN gateway functions as one end of a VPN tunnel. A gateway may be a router or any network node, such as a firewall security device, hub, switch, computer system and the like, that connects a local network to other networks. In an embodiment, the VPN gateway receives incoming IPSec packets, decrypts the encapsulated data packets and passes the data packets to the local network. Further, the VPN gateway encrypts the data packets destined for the other end of the VPN tunnel, encapsulates them and sends the IPSec packets to the other VPN gateway.

The data while passing through the VPN tunnel is encrypted. In an embodiment, encryption may mathematically transform data to random numbers. The original data is known as plaintext and the encrypted data is known as ciphertext. The process by which a plaintext is transformed to ciphertext and back again is referred to as an algorithm. Algorithms use a small piece of information, for example a key, in the arithmetic process of conversion. IPSec uses symmetrical algorithms in which the same key is used to both encrypt and decrypt the data.

In an embodiment, in addition to protecting data through encryption, a Pre-Shared Key (PSK) or digital certificates may be used to ensure authorized access of the private network. A PSK may contain six or more random alphanumeric characters. The PSK is used in calculations at each end of the VPN tunnel that generate the encryption keys. When the VPN peers attempt to exchange data, if the PSK keys do not match, it causes the process to fail.

In an embodiment, the VPN tunnel is established in two phases, phase 1 and phase 2, using a protocol. In an embodiment, the protocol used is an Internet Key Exchange (IKE). In phase 1, two VPN gateways, for example firewall security device 104*a* and firewall security device 104*b*, exchange information about the encryption algorithms that they support and then establish a temporary secure connection to exchange authentication information. In an embodiment, for a VPN gateway, the following settings may be specified for phase 1:

Remote Gateway: The remote VPN gateway's address.

Pre-Shared Key (PSK): This is used to encrypt phase 1 authentication information. PSK should be the same at both ends of the tunnel.

Local Interface: This is the network interface that connects to the other VPN gateway. In an embodiment, local interface is applicable to firewall security device.

In phase 2, the two VPN gateways exchange information about the encryption algorithms that they support for phase 2. In an embodiment, phase 1 and phase 2 utilize different encryption mechanisms. In another embodiment, phase 1 and phase 2 utilize the same encryption mechanism. When both the VPN gateways have at least one of the phase 1 and phase 2 encryption algorithms in common, then a VPN tunnel may be established.

In an embodiment, when the negotiations of phase 1 are successful, a Security Association (SA) is established. Each peer (network device that brings up a VPN tunnel or responds to a request to do so) may maintain a database of information about VPN connections. The information in each SA may include cryptographic algorithms and keys, keylife, and the current packet sequence number. This information is kept synchronized as the VPN operates. Each SA has a Security Parameter Index (SPI) that is provided to the remote peer at the time the SA is established. Subsequent IPSec packets from the peer always reference the relevant SPI. In an embodiment, a peer may have multiple VPNs active simultaneously, and the corresponding multiple SPIs.

With continuing reference to FIG. 1, firewall security device 104*a* may represent a VPN gateway, ensuring the security of the unencrypted VPN data. FIG. 1 shows a VPN connection 110 between networks 100*a* and 100*b* with firewall security devices 104*a* and 104*b* acting as the VPN gateways. This configuration is referred to as a gateway-to-gateway/site-to-site IPSec VPN. The IPSec traffic may pass through many Internet routers, but the VPN connection/tunnel may be visualized as a simple secure connection between two firewall security devices.

As explained above, applications on one or more computer systems 108*a-f* generate packets with appropriate source and destination addresses. Firewall security devices 104*a* and 104*b* manage the details of encryption, encapsulation, and data packet transmission to a remote VPN gateway. In site-to-site IPSec VPNs, data is encapsulated in IPSec packets only in VPN tunnel 110 between the two VPN gateways i.e., firewall security device 104*a* and firewall security device 104*b*. Data on the secure private network is in regular IP packets between the computer systems and their respective firewall security devices. Further, in a site-to-site configuration, both firewall security devices 104*a* and 104*b* have static IP addresses and either of the firewall security devices 104*a* and 104*b* forming the VPN tunnel 110 can initiate communication.

In an exemplary embodiment of the present invention, firewall security devices 104a and 104b may be FORTIGATE security platforms and switching devices 106a and 106b may be a FORTISWITCH switching platform available from Fortinet, Inc. of Sunnyvale, Calif. (FORTIGATE and FORTISWITCH are trademarks or registered trademarks of Fortinet, Inc.).

Figure 2A:
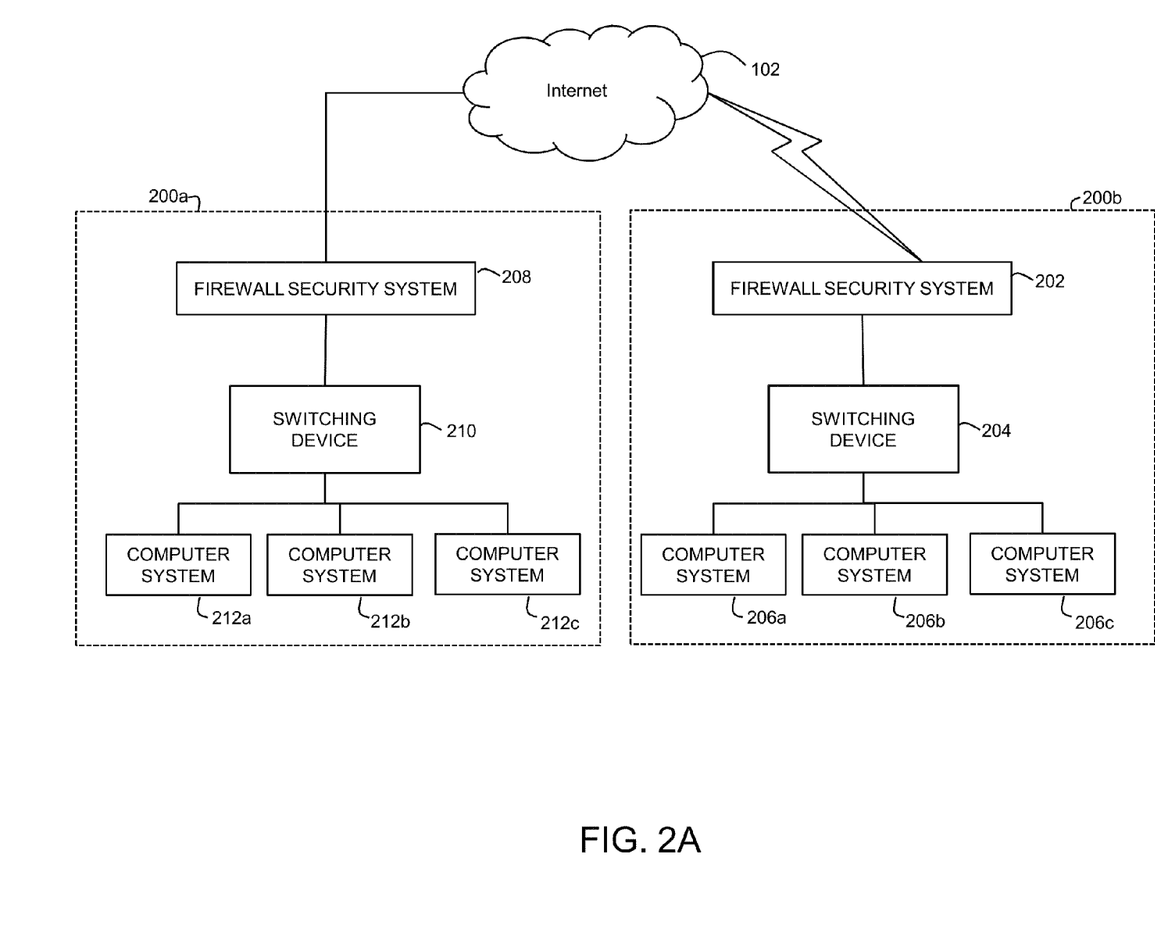
FIG. 2A illustrates a dial-up client configuration of a VPN IPSec tunnel according to an embodiment of the present invention.

FIG. 2A illustrates a dial-up client configuration of a VPN IPSec tunnel configuration according to an embodiment of the present invention. Dial-up configuration generally means one of the sites (e.g., the remote site) is behind a Network Address Translation (NAT) boundary or its public IP address may be dynamic or change over time. Therefore, the remote site will "dial up" the VPN to the central site. With reference to FIG. 2A, firewall security device 208 acts as a dial-up server with a static IP address. Firewall security device 202 having a dynamic IP address initiates a VPN tunnel with the dial-up server i.e. firewall security device 208.

In one embodiment, dial-up configuration works similarly to site-to-site tunnel configuration. Alternatively, the remote site administrator may input both PSK and an IP address.

In an embodiment, the dial-up client is a firewall security device. The dial-up client may obtain a dynamic IP address from an ISP through the Dynamic Host Configuration Protocol (DHCP) or Point-to-Point Protocol over Ethernet (PPPoE) before initiating a connection to the dial-up server. In the dial-up client configuration, the dial-up server does not rely on a phase 1 remote gateway address to establish an IPSec VPN connection with dial-up clients. When the authentication is successful and the IPSec security policy associated with the tunnel permits access, the VPN tunnel is established.

In an embodiment, in a dial-up client configuration, a user behind the dial-up server, for example firewall security device 208, may not be able to initiate the VPN tunnel as the dial-up client, for example firewall security device 202, does not have a static IP address.

When a tunnel is initiated by users behind the dial-up client i.e. firewall security device 202, traffic from network behind the firewall security device 208 may be sent to the to network behind the firewall security device 202. That is, when firewall security device 202 initiates the VPN tunnel, traffic from network 200a can be sent to network 200b.

In an embodiment, encrypted packets from the firewall security device 202 are addressed to a public interface of firewall security device 208. In an embodiment, encrypted packets from firewall security device 208 are addressed to the public IP address of the firewall security device 202, when the firewall security device 202 is connected to the Internet directly. In another embodiment, when the firewall security device 202 is behind a Network Address Translation (NAT) device, encrypted packets from the firewall security device 208 are addressed to the public IP address of the NAT device.

In an embodiment, when the dial-up server, i.e. firewall security device 208, decrypts a packet from the dial-up client, i.e. firewall security device 202, the source address in the IP header is the private IP address of a host/server on the network behind the firewall security device 202. In another embodiment, when the firewall security device 202 is behind a NAT device, the source address is the public IP address of the NAT device.

Figure 2B:
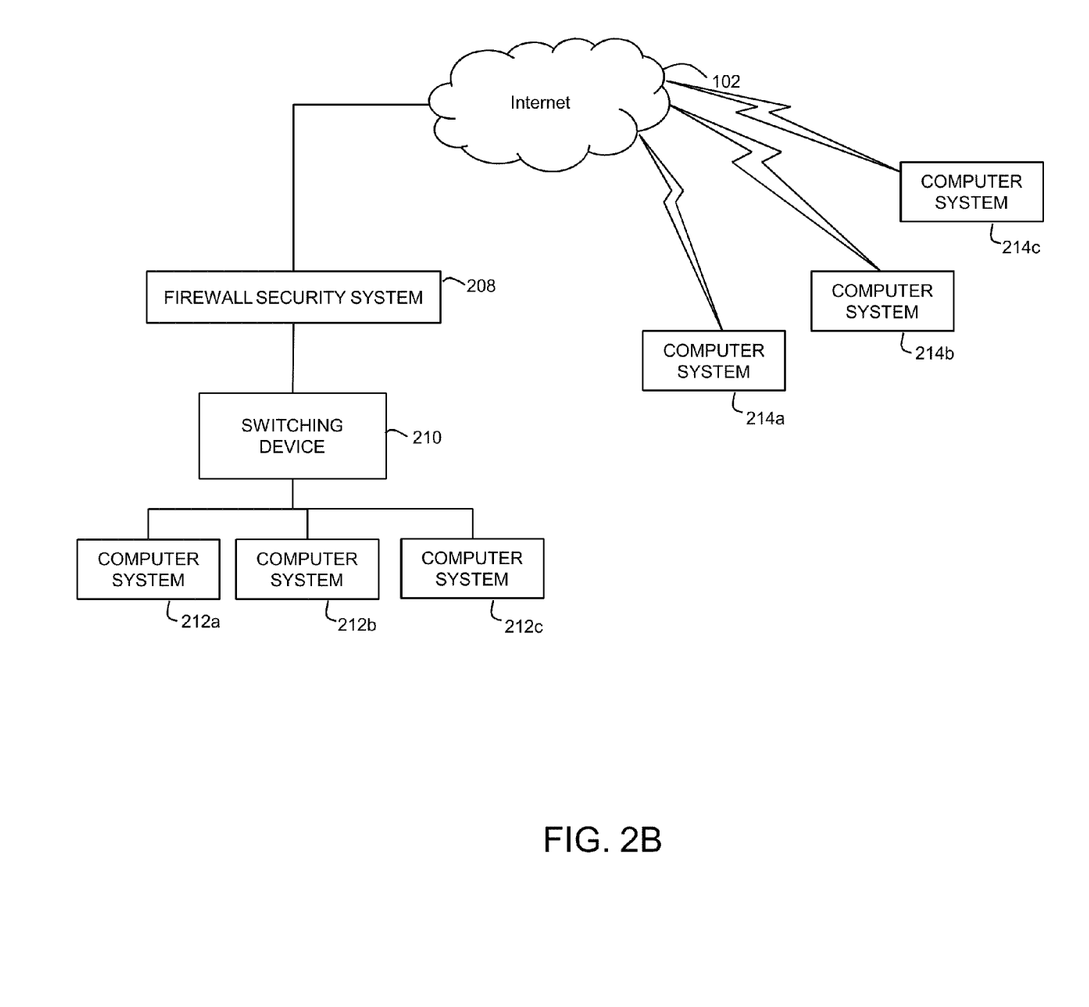
FIG. 2B illustrates configuration of a VPN IPSec tunnel in an environment in which one or more computer systems act as VPN clients according to an embodiment of the present invention.

FIG. 2B illustrates configuration of a VPN IPSec tunnel in an environment in which one or more computer systems act as VPN clients according to an embodiment of the present invention. In an embodiment, one or more of computer systems 214a, 214b and 214c have installed thereon a security application, such as a FORTICLIENT security application, which is available from Fortinet, Inc. of Sunnyvale, Calif. (FORTICLIENT is a trademark or registered trademark of Fortinet, Inc.). In a dial-up configuration, firewall security device, for example, firewall security device 208 acts as a dial-up server and the security application installed on the remote host provides the functionality of the VPN client. For example, computer system 214a, computer system 214b, and computer system 214c act as VPN clients. In an embodiment, the security application is an IPSec VPN client with anti-virus, anti-spam and firewall capabilities. Users of computer systems 214a, 214b and 214c may be mobile or remote users who need to connect to a private network behind a firewall security device. For example, the users might be employees who connect to the office network while travelling or from their homes. In an embodiment, the security application installed on computer systems 214a, 214b and 214c may download VPN settings from the firewall security device to configure itself automatically. In another embodiment, manual configuration may be employed.

In an embodiment, the security application dial-up client has the same IP address as the host PC on which it runs. For example the security application running on computer system 214a has the IP address of computer system 214a. When the host, i.e. computer system 214a is directly connected to the Internet, it is a public IP address. In another embodiment, when the computer system 214a is behind a NAT device, such as a router, the IP address is a private IP address.

In an embodiment, the security application may be configured to use a virtual IP address (VIP). For the duration of the connection, the security application running on computer system 214a, for example, and firewall security device 208, both use the VIP address as the IP address of the security application dial-up client.

Figure 3:
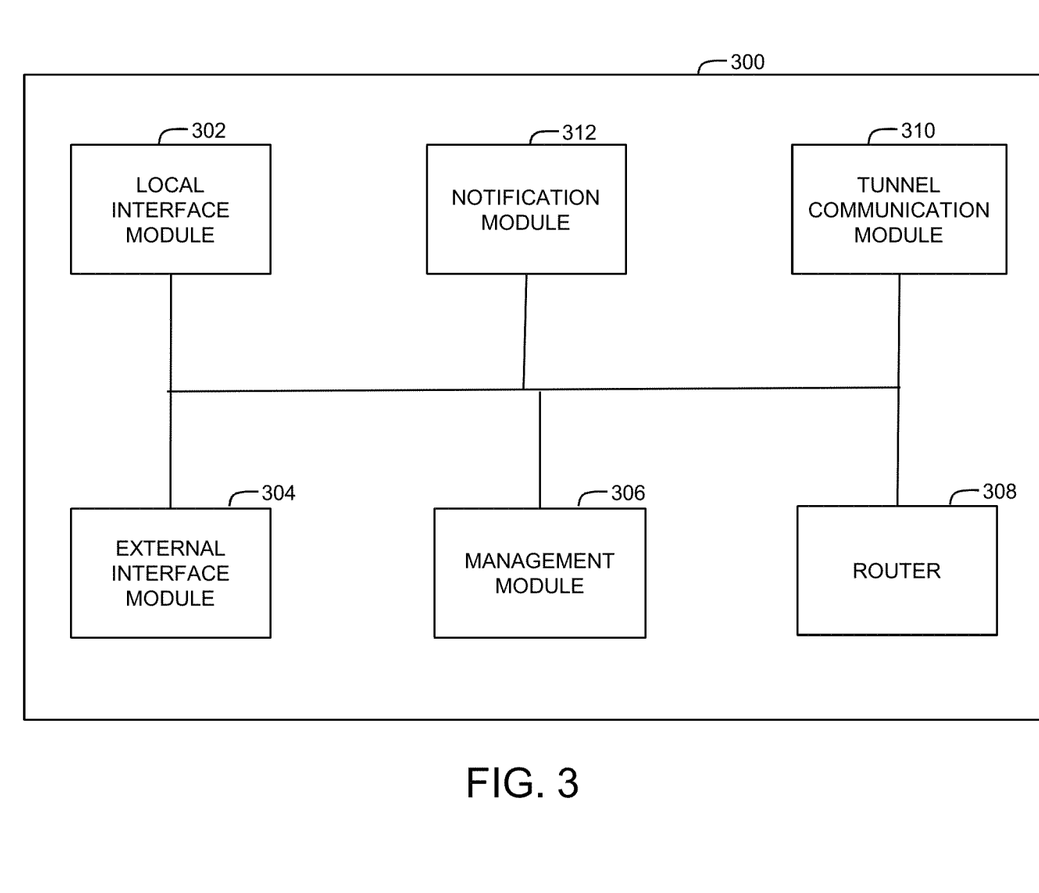
FIG. 3 is a block diagram conceptually illustrating interaction among various functional units of a VPN gateway in accordance with an embodiment of the present invention.

FIG. 3 is a block diagram illustrating various modules of a VPN gateway 300, such as firewall security device 104a, in accordance with an embodiment of the present invention. In the present example, VPN gateway 300 includes a local interface module 302, an external interface module 304, a management module 306, a router 308, a tunnel communication module 310, and a notification module 312.

According to one embodiment, the local interface module 302 provides a physical and data-link layer communication interface with one or more computer systems, such as computer systems 108a-c. Local interface module 302 accepts and provides IP packets over an internal data path and interfaces with the network link. The external interface module 306 accepts and provides IP packets over data paths from and to other modules in VPN gateway 300, and provides physical and data-link layer interfaces to a communication link that couples VPN gateway 300 to the external network.

Further, the external communication module 306 is coupled to the management module 306. Management module 306 establishes a communication session with a management server. In an embodiment, the management server directs VPN gateways to establish tunnels among one another. Further, the management server may also control operations of the VPN gateways. This control includes authenticating the VPN gateways, and providing information that the VPN gateways use to establish secure communication tunnels. In an embodiment, the management server provides session keys to the VPN gateways, for example firewall security device 104a, for encrypting communication passing through the tunnels. The management server may thus limit which devices enter into a VPN and may also prevent device that it cannot authenticate, from entering the VPN.

In an embodiment, management module 306 includes a key exchange module to exchange cryptographic keys with other computer systems or network devices on Internet 302 in order to establish secure tunnels with them. The management module 306 may also include a Dynamic Host Configuration Protocol (DHCP) client to obtain an external IP address for the VPN gateway. This address is associated with the external interface module 304, and is used by other devices on the Internet to address IP packets to the VPN gateway. In an embodiment, management module 306 may also contain a Standard Network Management Protocol (SNMP) agent to monitor information to other network management computers.

Management module 306 is coupled to the notification module 312. Notification module 312 sends a notification request (message exchange) to a peer in the network, when the policy is configured for the VPN gateway. Further, notification module 312 also updates the VPN tunnel status initiated by the tunnel communication module 310. In an embodiment, when the VPN gateway receives any request for establishment of a tunnel, then the notification module 312 notifies the user of the same.

Management module 306 is further coupled to the tunnel communication module 310. In an embodiment, the management module 306 directs the tunnel communication module 310 to establish and maintain communication with other VPN gateways to provide IPSec based communication between routers of different gateways.

Router 308 accepts IP packet from a number of data paths within a VPN gateway, and routes those packets to other data paths. For example, router 308 accepts IP packets over a data path from the local interface module 302. Based on various parameters, such as information stored in a routing database, type of packet, destination address in the packet, router 308 determines whether the accepted packet should be routed over a data path through one of the tunnels maintained by tunnel communication module 310, should be routed directly to the Internet through external interface module 304, or should be processed in some other way. In another embodiment, router 308 exchanges routing information with routers of other VPN gateways.

In one embodiment of the present invention, the functionality of one or more of the above-referenced functional units may be merged in various combinations. For example, local interface module 302 may be incorporated within external interface module 304 or notification module 312 may be incorporated within tunnel communication module 310. Moreover, the functional units can be communicatively coupled using any suitable communication method (e.g., message passing, parameter passing, and/or signals through one or more communication paths etc.). Additionally, the functional units can be physically connected according to any suitable interconnection architecture (e.g., fully connected, hypercube, etc.). In an exemplary embodiment of the present invention, one or more of the above-referenced functional units may be implemented in a content aware processor, which may comprise a content addressable memory (CAM), such as a ternary CAM (TCAM).

According to various embodiments of the present invention, the functional modules can be any suitable type of logic (e.g., digital logic) for executing the operations described herein. Any of the functional modules used in conjunction with embodiments of the present invention can include machine-readable media including instructions for performing operations described herein. Machine-readable media include any mechanism that provides (i.e., stores and/or transmits) information in a form readable by a machine (e.g., a computer). For example, a machine-readable medium includes read only memory (ROM), random access memory (RAM), magnetic disk storage media, optical storage media, flash memory devices, electrical, optical, acoustical or other forms of propagated signals (e.g., carrier waves, infrared signals, digital signals, etc.), etc.

Figure 4A:
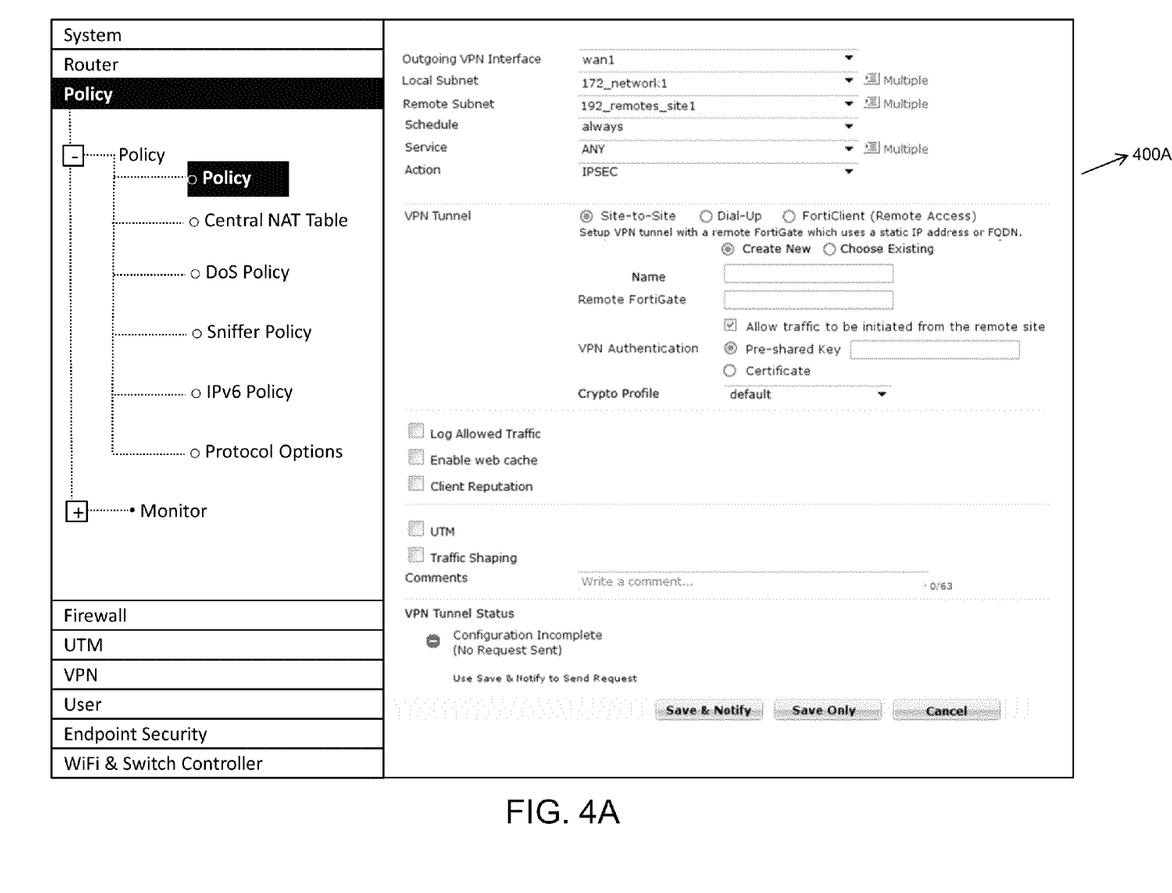
FIGS. 4A, 4B and 4C collectively depict various screen shots of a browser-based graphical user interface (GUI) of a network device for creating and/or editing IPSec policies for VPN setup according to various embodiments of the present invention.
Figure 4B:
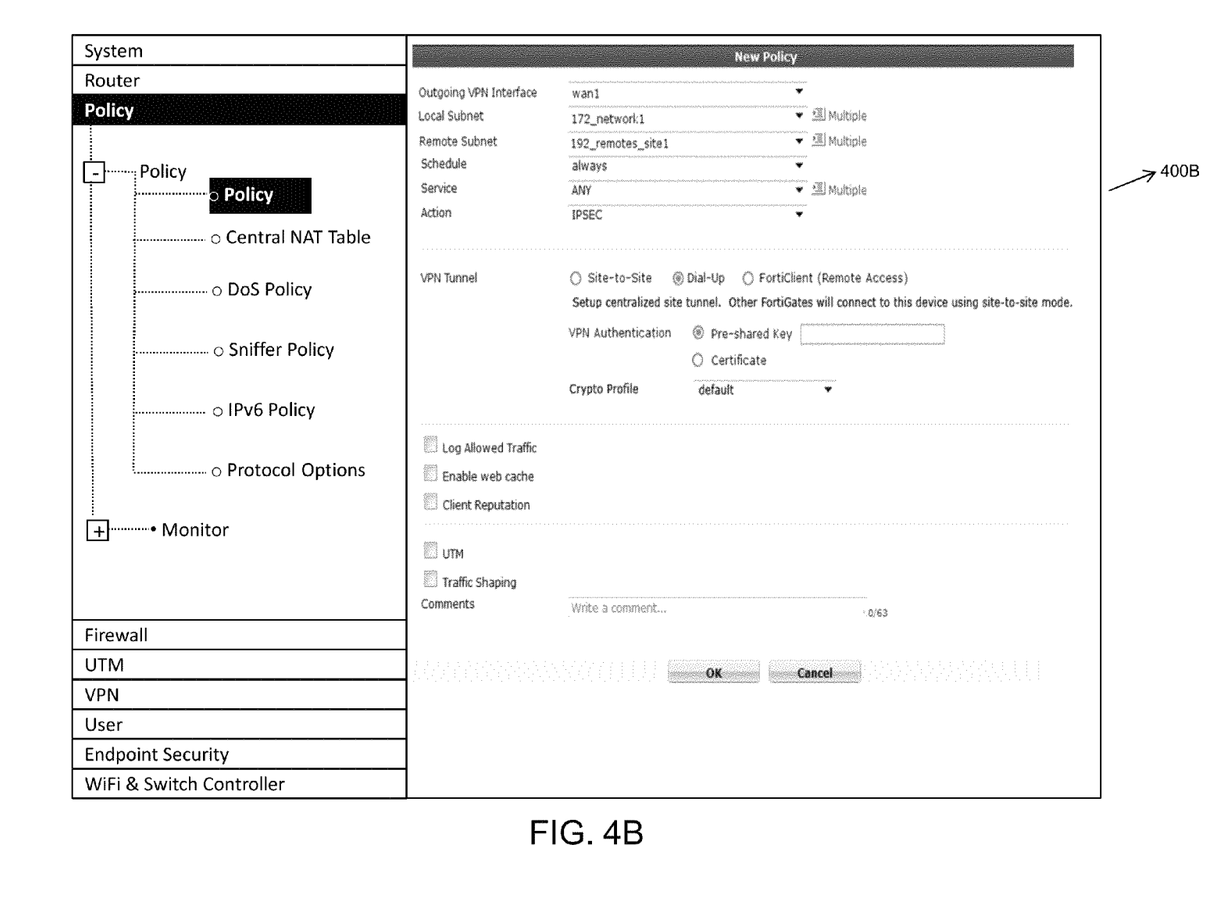
Figure 4C:
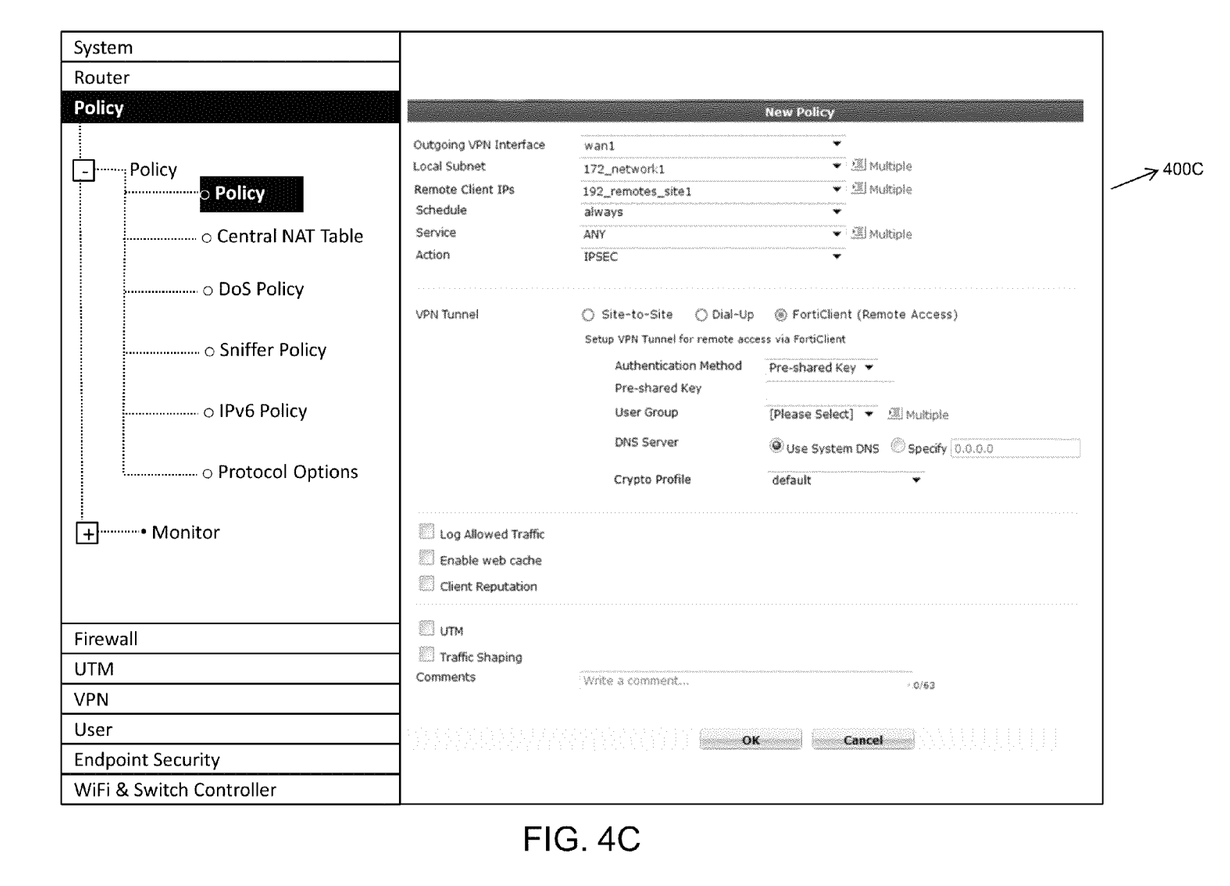

FIGS. 4A, 4B and 4C collectively depict various screen shots of a browser-based graphical user interface (GUI) of a network device for creating and/or editing IPSec policies for VPN setup according to various embodiments of the present invention. The network device may be any device capable of participating in a VPN, including, but not limited to a router, a network switch, a firewall security device, a gateway, a modem, a broadband device and a computer system. The network device may also be a remote management system for remotely configuring various network devices and properties of the network 100 such as routers, policies, firewall, Unified Threat Management (UTM) profiles, VPN, Wireless controller and the like.

In an embodiment, to configure the policy of a VPN, a user may select Policy→Policy in a menu layout provided by a browser-based GUI of a network device that is to represent one end of a VPN tunnel. When the user selects the policy tab, a page, such as page 400A (policy page) is displayed. Various parameters such as outgoing VPN interface (the interface that connects to the peer), local subnet (shared networks), remote subnet (networks that are accessible on other side of the peer), schedule, service, and action are entered. In a policy-based VPN, one security policy enables communication in both directions. In an embodiment, for configuring the VPN, IPSec is selected as the Action. A VPN tunnel is then defined in the phase 1 settings. In an embodiment of the present invention, the type of VPN tunnel may be selected from a set of IPSec tunnel types, including, but not limited to, site-to-site, dial-up client, and FortiClient (remote access). Various parameters such as Name, remote firewall security device (gateway), VPN authentication, and crypto profile may be set via page 400A. Additional settings, such as traffic flow, type of authentication, web cache, client reputation, traffic shaping, antivirus, intrusion prevention, application control, web filtering, SSL inspection, spam detection and the like may also be configured Further, page 400A comprises a 'Save and Notify' button. When a user selects this button, the policy parameters entered by the user are saved and a notification request is sent to a peer (VPN client) for tunnel establishment. In another embodiment, page 400A may also depict information in textual and/or graphical form that indicates the VPN tunnel status and the VPN tunnel status may be updated based on the messages exchanged between two gateways.

According to the present example, a new site-to-site configuration tunnel is being established. As explained with reference to FIG. 1, in a site-to-site configuration, a VPN tunnel is setup with a remote firewall security device, which uses a static IP address.

FIG. 4B depicts a page 400B for creating a dial-up client configuration. As explained above, in dial-up configuration a centralized site tunnel is setup and other firewall security devices (gateways) connect to this central device using site-to-site mode.

FIG. 4C depicts a page 400C for creating a FortiClient configuration (remote access configuration). As explained with reference to FIG. 2B, in FortiClient configuration a VPN tunnel is setup for remote access via a FortiClient application running on a remote system. In an embodiment, for a FortiClient configuration, the IPSec policy automatically assigns default Phase 1 and Phase 2 configuration profiles. A user may able to tune the phase configurations through Command Line Interface (CLI) syntax.

While in the context of various examples, a browser-based GUI is implemented by a network device, it is contemplated that the GUI could also be implemented as a web-based portal directly or indirectly (via a remote management system, for example) in communication with the network devices to be managed thereby.

Figure 5:
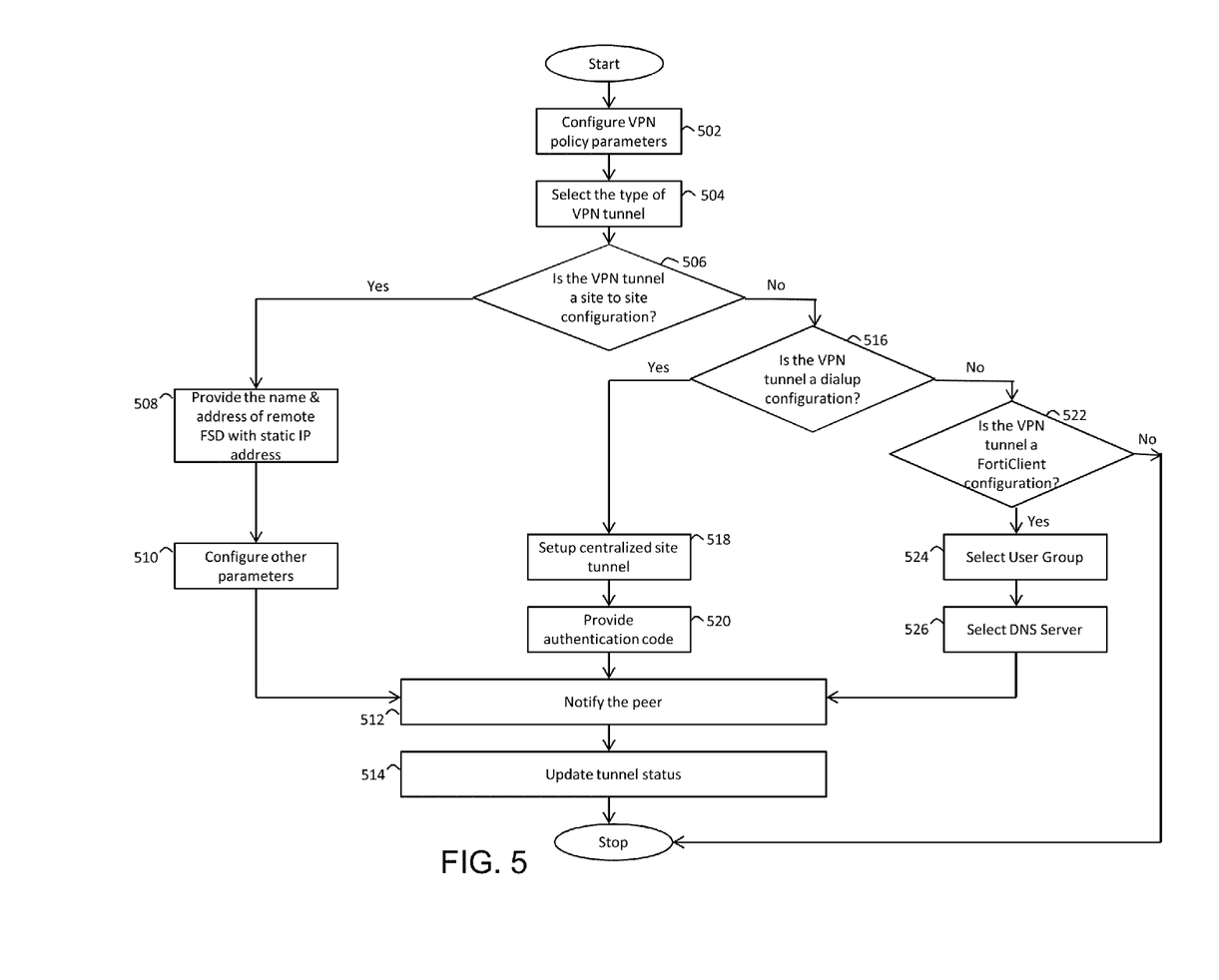
FIG. 5 is a flow diagram illustrating VPN policy configuration processing in accordance with an embodiment of the present invention.

FIG. 5 is a flow diagram illustrating VPN policy configuration processing for a network, such as network 100, in accordance with an embodiment of the present invention. Depending upon the particular implementation, the various process and decision blocks described in connection with this and other flow diagrams may be performed by hardware components, embodied in machine-executable instructions, which may be used to cause a general-purpose or special-purpose processor programmed with the instructions to perform the steps, or the steps may be performed by a combination of hardware, software and firmware.

At block 502, when a user selects the Policy tab on page 400A, various VPN policy parameters are configured. The configuration parameters include, but are not limited to, outgoing VPN interface (the interface that connects to the peer), local subnet (shared networks), remote subnet (networks that are accessible on the other side of the peer), schedule, service, and action.

When a user selects IPSec as the 'Action' item, then at block 504, the type of VPN tunnel configuration is selected. Various VPN tunnel configurations are site-to-site, Dial-up client, and FortiClient (remote access).

At block 506, the system checks if the configuration is site-to-site. If so, then at block 508, the name and address of a remote firewall security device with a static IP address is provided. This firewall security device acts as one end of a VPN tunnel.

At block 510, other parameters of the VPN tunnel are configured, such as authentication, logging of traffic, enabling web cache, Unified Threat Management (UTM), traffic shaping and the like.

It should be noted that only exemplary configuration parameters are mentioned above. It should be apparent to a person ordinarily skilled in the art that other parameters (other than the ones listed above) may be included in the GUI without deviating from the scope of the invention.

At block 512, a notification to a peer is provided. The notification may be provided by clicking the 'Save and Notify' button on the GUI. In an embodiment, when the user clicks on the 'Save and Notify' button, the IPSec policy is saved and errors (if any) are prompted on the interface. Further, a notification to the peer is sent and the user is directed back to a policy table page. The notification message may contain a request for establishment of the VPN tunnel.

At block 514, the VPN tunnel status is updated on the GUI. In an embodiment, the VPN tunnel status may change among various states at the sender side. In an embodiment, these states (and their meanings) are as follows:

Not Sent: IPSec policy has been created; however, it has not been sent to a peer.

Sent: IPSec policy has been created and notification has been sent to a peer; however, the peer might not have received the notification yet.

Received: IPSec policy has been created and sent to a peer. Further, the peer has received the notification.

Up: IPSec tunnel is setup correctly

Rejected: IPSec policy request has been rejected by the peer

Notification messages and other messages exchanged between the gateway and the VPN client may be via any type of transport protocol. In one embodiment, such messages are exchanged via IPSec or SSL protocol based messages. In another embodiment, Internet Key Exchange (IKE) is used to facilitate a secure connection from the gateway to the client. When the notification message exchange is complete, the client (peer device) acknowledges that gateway wants to establish a tunnel. Further, the notification message provides the IP address of the gateway to the client. The user then enters the authentication code (for example PSK or digital certificate) to establish the VPN tunnel. In one embodiment the information to setup the policy is also exchanged between the source endpoint, the endpoint on which the policy and VPN configuration parameters are established, e.g., the gateway, and the endpoint that is automatically configured, e.g., the client.

When at block 506, it is determined that the VPN tunnel is not a site-to-site configuration, then at block 516, the system checks if the VPN tunnel configuration is a dial-up configuration. If it is determined that the configuration is a dial-up client configuration, then at block 518, a centralized site tunnel is set-up. Other firewall security devices then connect to this centralized site tunnel in a site-to-site configuration.

At block 520, VPN authentication is provided and other VPN tunnel parameters are configured. In an embodiment, the VPN authentication is provided in the form of a Pre-shared Key (PSK). PSK is a shared secret or a password shared between the two gateways using a secure channel, and is used to secure traffic between the two VPN gateways. In another embodiment, the VPN authentication may be a digital certificate. The digital certificate is an electronic document that uses a digital signature to bind a public key with an identity. Further, the peer is provided with a notification and the VPN tunnel status is updated.

When at block 516, it is determined that the configuration is not a dial-up configuration, then at block 522, the system checks if the VPN tunnel configuration is selected to be a FortiClient configuration. If it is determined that it is not a FortiClient configuration, then the system assumes that the VPN tunnel configuration has not been selected, and the method terminates. However, if at block 522 it is determined that the configuration is a FortiClient configuration, then at block 524, the user group is provided. Further, at block 526, the DNS server is selected for remote operations. When the above configurations are set, the peer is provided with a notification and correspondingly the VPN tunnel status is updated.

In an embodiment, the CLI syntax for configuring VPN IPSec phase 1 policy on the gateway is as follows:

```
Config vpnipsec phase1
    edit<gw_name>
        set interface <ifname>
        setautoconfig gateway
        set remote-gw<IP address>
        setpsksecret<PSK>
    next
end
```

Alternative CLI syntax will be readily apparent to those of ordinary skill in the art.

Figure 6:
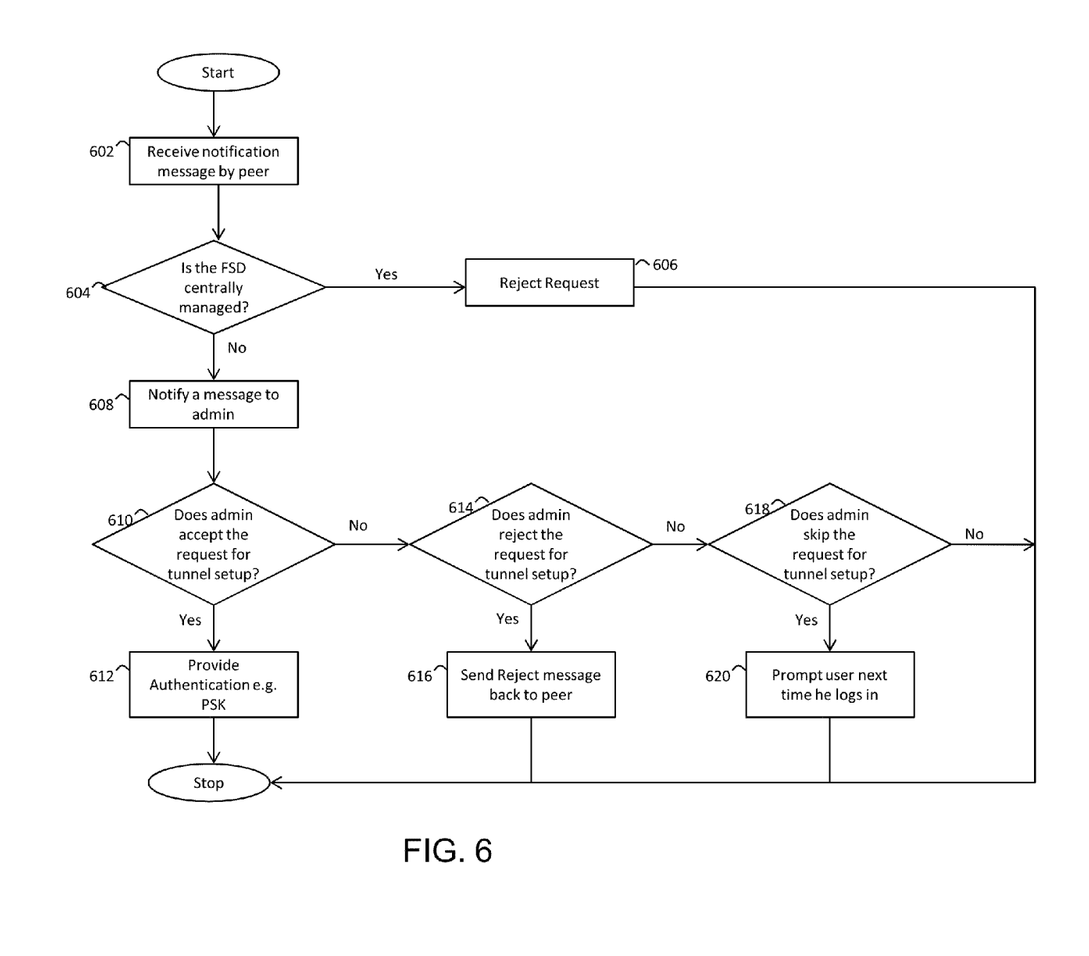
FIG. 6 is a flow diagram illustrating VPN tunnel setup processing in accordance with an embodiment of the present invention.

FIG. 6 is a flow diagram illustrating VPN tunnel setup processing in accordance with an embodiment of the present invention. At block 602, a firewall security device or a gateway receives a notification message from a peer to set up a VPN tunnel. At block 604, the firewall security device checks if it is centrally managed by a remote management system. If at block 604, the firewall security device determines that it is centrally managed, then the firewall security device rejects the VPN tunnel setup request at block 606. The method terminates thereafter.

However, if at block 604, the firewall security device determines that it is not centrally managed, then at block 608 the firewall security device pops up a notification message to an administrator the next time the administrator logs in on the computer system remote managing the firewall security device. When the notification message is provided to the administrator, then at block 610, it is checked if the administrator accepts the request for the VPN tunnel setup. When the administrator accepts the tunnel setup request, then at block 612, the administrator provides the VPN authentication code for the tunnel establishment. In an embodiment, the authentication code is a PSK. In another embodiment, the authentication code is a digital certificate. Further, the VPN, policy, and router settings are retrieved and thereby installed automatically.

In an embodiment, when the user hits an accept button, the following CLI is dynamically added on the receiver (client) side:

```
Config vpnipsec phase1
    edit<gw_name>
        set interface <ifname>
        setautoconfig client
        set remote-gw<IP address>
        setpsksecret<PSK>
    next
end
```

In an embodiment, when the user accepts the request for tunnel establishment from the gateway, the dynamically created client tunnel connects to the gateway and downloads the source and destination subnets for the tunnel. Further, the tunnel installs firewall addresses, a source and destination address group, and one or more policies (as determined by routing) in the configuration.

If at block 610, it is determined that the administrator does not accept the request for the VPN tunnel setup, then at block 614, it is checked if the administrator has rejected the request for the tunnel setup. When at block 614 it is determined that the administrator has rejected the request for the VPN tunnel setup, then at block 616, a reject message is sent back to the peer and the method then terminates.

However, if at block 614 the administrator does not reject the request for tunnel setup, then at block 618 it is checked if the request for tunnel setup has been skipped. If it is determined that the request has not been skipped, then the method terminates. However, if it is determined that the request for VPN tunnel setup has been skipped, then no message is sent back to the peer. Further, at block 620 the administrator is prompted with a setup request message the next time he logins. Thereafter the method terminates.

In an embodiment, during the process of VPN tunnel setup, the receiver side (client/peer) may change various states of the VPN tunnel. These states (and their meanings) are as follows:

Received: Request is pending i.e., neither accepted, nor rejected
Up: IPSec tunnel is setup correctly In an embodiment, once the VPN configuration is set, the original firewall security device that created the tunnel (gateway) is allowed to change any settings in the configuration i.e., updates may be made by the gateway initiating the VPN tunnel. For example, changes to policy on the gateway side, such as addition or removal of source or destination subnets from the policy, are synced to the client automatically.

The configuration is read-only on the client that receives the configuration and that client cannot make any updates to the configuration. For example, on the client side, if the user accidently overwrites or deletes something in the dynamically created configuration, the change is detected and the configuration is re-synced.

In an embodiment, the client enters the authentication code once, when the tunnel is setup. For updates made to the configuration, the authentication code is entered only when a user changes the authentication code. i.e. PSK or digital certificate. In another embodiment, the authentication code is entered every time there is update in VPN configuration.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A network device comprising
a non-transitory storage device having embodied therein one or more routines operable to facilitate policy-based configuration of Internet Protocol Security (IPSec) for a Virtual Private Network (VPN) connection; and
one or more processors coupled to the non-transitory storage device and operable to execute the one or more routines, where
the one or more routines cause a policy page to be displayed to a network administrator via a user interface of the network device through which a policy, including a plurality of VPN settings for establishing the VPN connection, is viewed and configured, the plurality of VPN settings including a type of IPSec tunnel to be established between the network device and a peer network device;
the one or more routines receiving, via the user interface, a selection regarding the type of IPSec tunnel to be used for the VPN connection; and
the one or more routines requesting the VPN connection be established between the network device and the peer network device in accordance with the policy by sending a notification request, including parameter values associated with the plurality of VPN settings, from the network device to the peer network device.

2. The network device of claim 1, wherein the type of IPSec tunnel to be established comprises a site-to-site tunnel.

3. The network device of claim 1, wherein the policy page includes sufficient VPN settings to allow the VPN connection to be established between the network device and the peer network device.

4. The network device of claim 1, further comprising assigning default phase-1/phase-2 configuration profiles to the VPN connection.

5. The network device of claim 1, wherein the network device comprises a router, a network switch, a firewall security device or a gateway device.

* * * * *